United States Patent [19]

Gattey et al.

[11] Patent Number: 5,414,769
[45] Date of Patent: * May 9, 1995

[54] ARTICULATED HEADSET SUPPORT

[75] Inventors: Phillip A. Gattey, Los Gatos; Christine Burris, Santa Cruz; Wolfgang W. Jensen, Aptos, all of Calif.

[73] Assignee: ACS Communications, Inc., Scotts Valley, Calif.

[*] Notice: The portion of the term of this patent subsequent to Nov. 9, 2010 has been disclaimed.

[21] Appl. No.: 255,232

[22] Filed: Jun. 7, 1994

Related U.S. Application Data

[63] Continuation of Ser. No. 103,344, Aug. 6, 1993, abandoned, which is a continuation of Ser. No. 925,317, Aug. 4, 1992, Pat. No. 5,260,997, which is a continuation of Ser. No. 785,531, Oct. 31, 1991, abandoned.

[51] Int. Cl.$^6$ .................................................. H04M 1/00
[52] U.S. Cl. ................................................................ 379/430
[58] Field of Search .............. 379/430; 381/68.5, 68.7, 381/69, 183, 187

[56] References Cited

U.S. PATENT DOCUMENTS

| | | | |
|---|---|---|---|
| 2,474,135 | 6/1949 | White . | |
| 2,882,348 | 4/1959 | Erickson | 381/68.7 |
| 2,938,083 | 5/1960 | Herrmann . | |
| 3,440,365 | 4/1969 | Bryant et al. | 379/430 |
| 3,527,901 | 9/1970 | Geib . | |
| 3,548,118 | 12/1970 | Hutchings | 379/430 |
| 3,665,122 | 5/1972 | Weiss . | |
| 3,692,958 | 9/1972 | Dymoke | 379/430 |
| 3,862,378 | 1/1975 | Norris . | |
| 4,020,297 | 4/1977 | Brodie | 379/430 |
| 4,273,969 | 6/1981 | Foley et al. | 379/430 |
| 4,893,344 | 1/1990 | Trägardh et al. | 379/430 |
| 4,917,504 | 4/1990 | Scott et al. | 381/68.7 |

FOREIGN PATENT DOCUMENTS 3723809 1/1989 Germany ........................ 381/68.7

*Primary Examiner*—James L. Dwyer
*Assistant Examiner*—Jack Chiang
*Attorney, Agent, or Firm*—Limbach & Limbach; Michael A. Stallman

[57] ABSTRACT

A communication headset is provided which includes two curved housings that rotate with respect to one another to allow the headset to be held firmly in place over one ear of the user. One housing supports a microphone boom which has a free end positionable adjacent to the users mouth and the other houses a receiver element for producing sound from electrical signals. Feedback between the receiver and the microphone is reduced by an elastomer friction hinge between the two housings. The receiver element is encapsulated by elastomer to further reduce feedback and to protect the receiver element from physical shock.

5 Claims, 1 Drawing Sheet

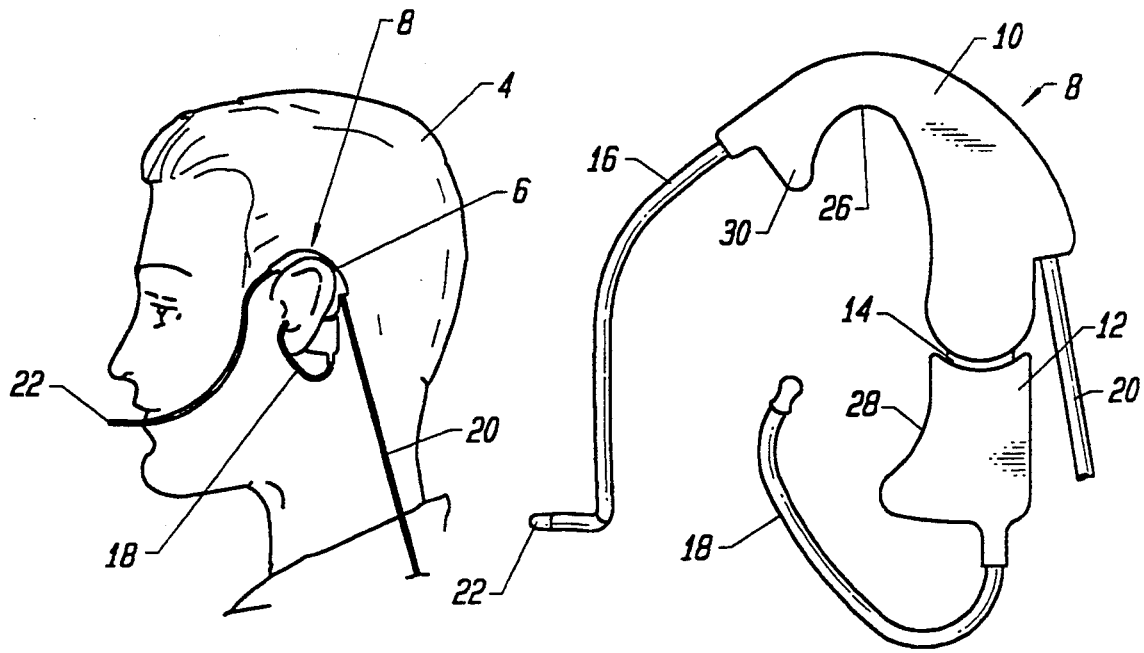
FIG. 1
FIG. 2
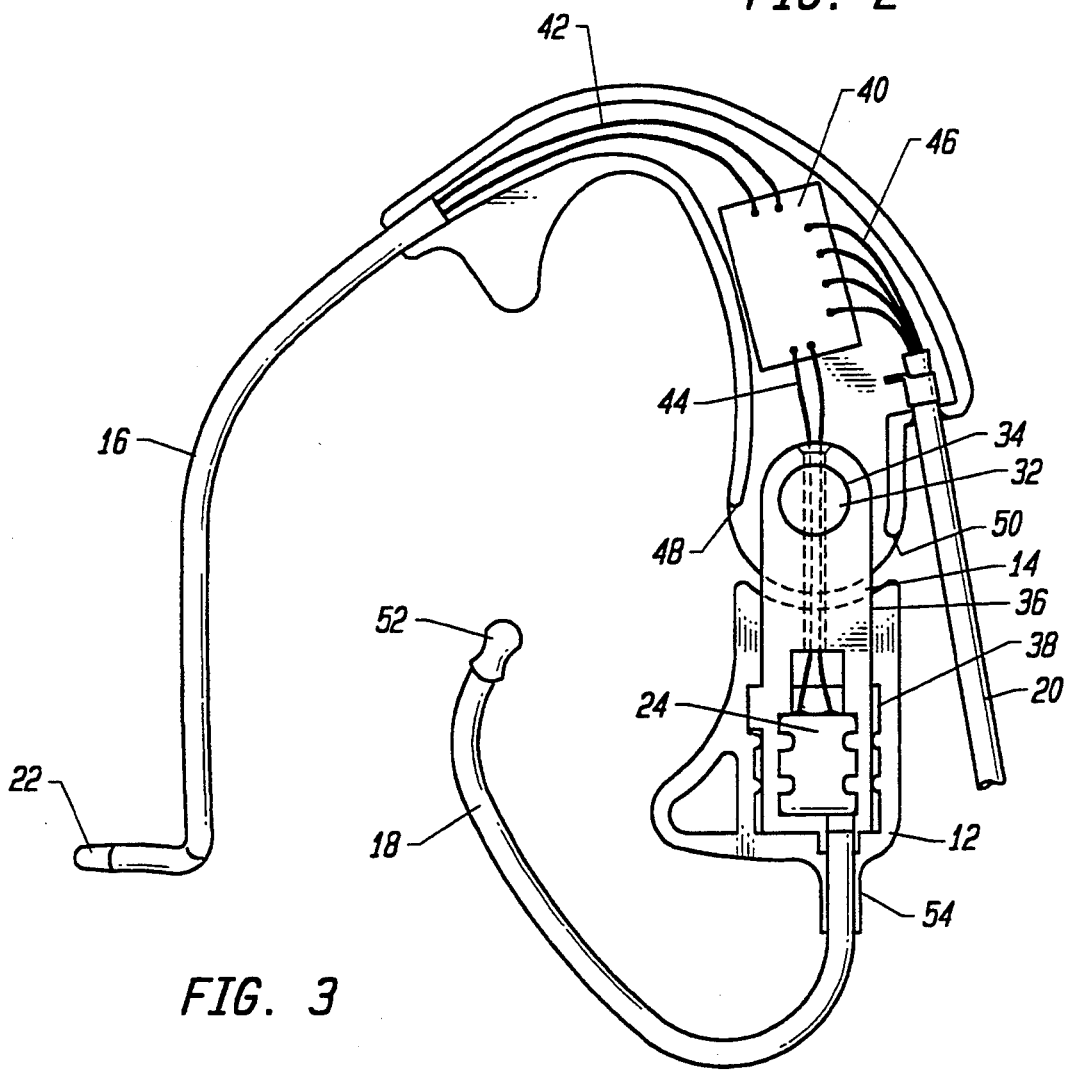
FIG. 3

ARTICULATED HEADSET SUPPORT

This is a continuation of application Ser. No. 08/103,344, filed on Aug. 6, 1993, now abandoned, which is a continuation of Ser. No. 07/925,317, filed on Aug. 4, 1992, (now U.S. Pat. No. 5,260,997), which is a file-wrapper-continuation of Ser. No. 07/785,531, filed on Oct. 31 1991, now abandoned.

BACKGROUND OF THE INVENTION

1. Field of the Invention

The present invention relates to communication headsets, particularly to small, lightweight headsets that are supported by one ear of the user, and contain a microphone for transmitting the user's voice, and a receiver for transmitting audio signals into the users ear.

2. Discussion of the Prior Art

As communication headsets continue to evolve over the years, the trend is towards miniaturization while increasing performance, comfort, and ease of use. There are many headset manufacturers who have succeeded in producing small, lightweight headsets. However, problems encountered in miniaturizing headsets include providing adequate stability on the users head, and reducing feedback or crosstalk between the microphone and the receiver channels. These issues have been addressed by much of the prior art, but have by no means been eliminated.

SUMMARY OF THE INVENTION

The present invention is a lightweight headset that can be worn behind either ear. It reduces feedback and increases stability on the ear by utilizing an articulated arrangement.

A microphone element and a receiver element are each supported by a separate housing. The two housings are connected to one another through a soft, flexible, friction hinge which serves to dampen vibrations and thereby acoustically separate the two elements.

The friction hinge also serves to adjust the headset to different ear sizes. The two housings pivot with respect to one another through the friction hinge and are adjusted to fit around the back of the ear. The friction hinge holds the two halves of the headset comfortably in position, thereby providing increased stability of the headset.

Another aspect of the present invention is to provide additional acoustical isolation and physical shock protection for the receiver element by enclosing it within the soft material of the friction hinge. This arrangement provides higher performance as well as a more durable headset.

BRIEF DESCRIPTION OF THE DRAWINGS

FIG. 1 illustrates the headset as it is worn on the user's ear.

FIG. 2 is a side elevation view of the exterior of the headset.

FIG. 3 is an enlarged, cutaway, side view of the headset.

DESCRIPTION OF THE PREFERRED EMBODIMENT

As shown in FIG. 1, the headset 8 of the present invention is worn by the user 4 over one ear 6. Referring to FIG. 2, the headset comprises a receiver housing 12 which is pivotally connected to a main housing 10.

The main housing 10 includes a contoured surface 26 that comfortably rests on top of the ear and a lobe 30 that helps to position the headset 8 on the ear. The receiver housing 12 also includes an arcuate surface 28 that contacts the lower-back portion of the ear when the receiver housing 12 is adjusted relative to the main housing 10.

A generally L-shaped microphone boom 16 is rotatively attached to the main housing 10 and is adjustable so that its free end can be positioned in front of the user's mouth, regardless of which ear the headset 8 is worn on. A microphone 22 can be located at the free end of the boom 16. In an alternate embodiment, the microphone could instead be located inside the main housing, and in communication with a hollow microphone boom which picks up the user's voice and transmits the audible sound waves up to the microphone.

Referring now to FIG. 3, an elastomer member 14 contains a bore 34 through one end which pivotally accepts a pin 32 of the main housing 10. The axis of pin 32 is substantially parallel to the auditory canal of the user's ear. Exterior wall openings 48 and 50 on the main housing 10 provide rotational stops for the elastomer element 14.

The opposite end of the elastomer member 14 includes a raised rib 38 around its circumference which engages a mating recess in the receiver housing 12 as the elastomer member 14 is partially received in bore 36 of the receiver housing 12, thereby securing the receiver housing 12 and the elastomer member 14 together.

A receiver element 24 for converting electrical signals into sound waves is encapsulated in the elastomer element 14 to acoustically isolate the receiver element 24 and protect it from physical shock. A passage through the end of the elastomer element 14 and through the bottom of the receiver housing 12 allows receiver element 24 to communicate with a tube fitting 54 at the bottom end of receiver housing 12. One end of a flexible hollow tube 18 is connected to the tube fitting 54 while the tube's other end is fitted with a hollow earplug 52. When the earplug 52 is inserted into the auditory canal of the user's ear, sound waves emanating from the receiver element 24 travel through the tube 18 into the users ear.

An interconnector 40 is located in the main housing 10 and connects a pair of wires 42 coming from the microphone 22 and a pair of wires 44 coming from the receiver element 24 to wires 46 of headset cable 20. Headset cable 20 connects the headset 8 to external communication equipment such as a telephone.

In the preferred embodiment, the main housing 10 and the receiver housing 12 are made of ABS and the elastomer element 14 is made of 80 Durometer Kraton® (a proprietary thermoplastic rubber from Shell Chemicals). To reduce weight, much of the housings are hollow space, as shown in FIG. 3.

In use, the main housing 10 of the present invention is placed over one ear and the receiver housing 12 is adjusted against the lower-back portion of the ear. The microphone 22 can then be positioned if necessary in front of the user's mouth and the headset cable 20 can be connected to the communication equipment.

The elastomer member 14 allows the articulated adjustment which provides stability for the headset on the user's ear, and acoustical separation between the microphone and receiver elements. The elastomer element also provides a soft housing for further reducing feedback and for protecting the receiver element from shock.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An articulated headset support, to be worn on an ear, comprising:
   a main housing having an arcuate surface that rests on top of the ear and extends to the back of the ear behind the pinna;
   a secondary housing having an arcuate surface that adjustably contacts the lower-back portion of the ear behind the pinna; and
   friction hinge means for pivotally connecting said main housing with said secondary housing, said hinge means being located behind the pinna at the back of the ear, said hinge means allowing the position of the main housing to be adjusted with respect to the secondary housing to permit the respective arcuate surfaces to be drawn closer together in a clamping motion so that a tight fit around the ear is achieved thereby providing enhanced stability.

2. A headset support as recited in claim 1 wherein said friction hinge means includes a journal member affixed to and extending from one of said housings and projecting into the other housing, with the end of the journal member projecting into said other housing being rotatably mounted thereto.

3. A headset support as recited in claim 2 wherein said journal member is made from an elastomer.

4. A headset as recited in claim 2 wherein said journal member extends from said secondary housing and projects into said main housing.

5. A headset support as recited in claim 1 further including microphone and receiver means operatively coupled to said housings to provide voice communications.

* * * * *